May 15, 1951 J. R. B. MONGE 2,553,465
MANUAL OR POWER-OPERATED PLANETARY TRANSMISSION
Filed Nov. 13, 1947 2 Sheets-Sheet 1

INVENTOR
JEAN RAYMOND BARTHELEMY MONGE
BY

May 15, 1951 J. R. B. MONGE 2,553,465
MANUAL OR POWER-OPERATED PLANETARY TRANSMISSION
Filed Nov. 13, 1947 2 Sheets-Sheet 2

INVENTOR
JEAN RAYMOND BARTHELEMY MONGE
BY

Patented May 15, 1951

2,553,465

UNITED STATES PATENT OFFICE 2,553,465

MANUAL OR POWER-OPERATED PLANETARY TRANSMISSION

Jean Raymond Barthélémy Monge, Paris, France

Application November 13, 1947, Serial No. 785,680
In France November 30, 1946

3 Claims. (Cl. 74—626)

Bicycles generally include a certain number of accessories assembled separately and operating independently one from the other (pedals, free-wheel, speed-gear, brake, lighting dynamo, speedometer, anti-theft lock, etc).

The universal equipment box houses in the same case, the whole of the members.

Its applications are not limited to bicycles; it can equip several types of vehicles (tandems, wheel-bicycle vehicles, carrier-tricycles, invalid tricycles, motorbicycles, cycle-cars, automobiles, etc.).

Finally, it can be adapted to varied industrial uses (machine-tools, mechanical installations, etc.).

Figure 1:
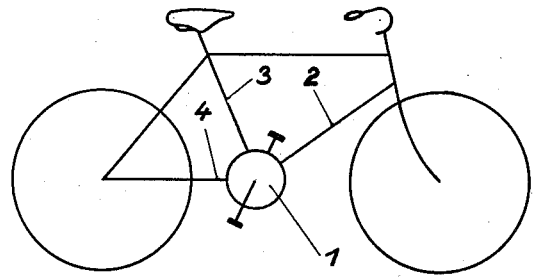
Figure 1 shows diagrammatically the adaptation of the box on a bicycle.
Figure 2:
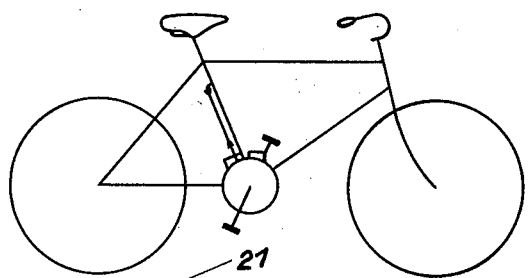
Figure 2 is a diagrammatic view of a bicycle including the invented box furnished with an anti-theft lock and a speedometer.

In the application to bicycles, the universal equipment box 1, is placed normally between the pedals. On this are joined together the three tubes 2, 3 and 4 which constitute the frame of the bicycle (Figure 1).

The pedal axle goes through the entire box. The usual arrangement of the pedals, their size and their spacing have in no way been modified.

The box can be calculated to give any number of speeds according to the number of pinions used.

The mentioned universal equipment or transmission box is operated either by pedals alone, in the case of bicycles and other vehicles driven by muscular effort, or by a mechanical prime mover such as a motor or engine, as in the case of automobiles, machine tools and the like, or even by a combination of these two as found in motorcycles and the like. This last form will be particularly considered as it is the most involved.

Figure 3:
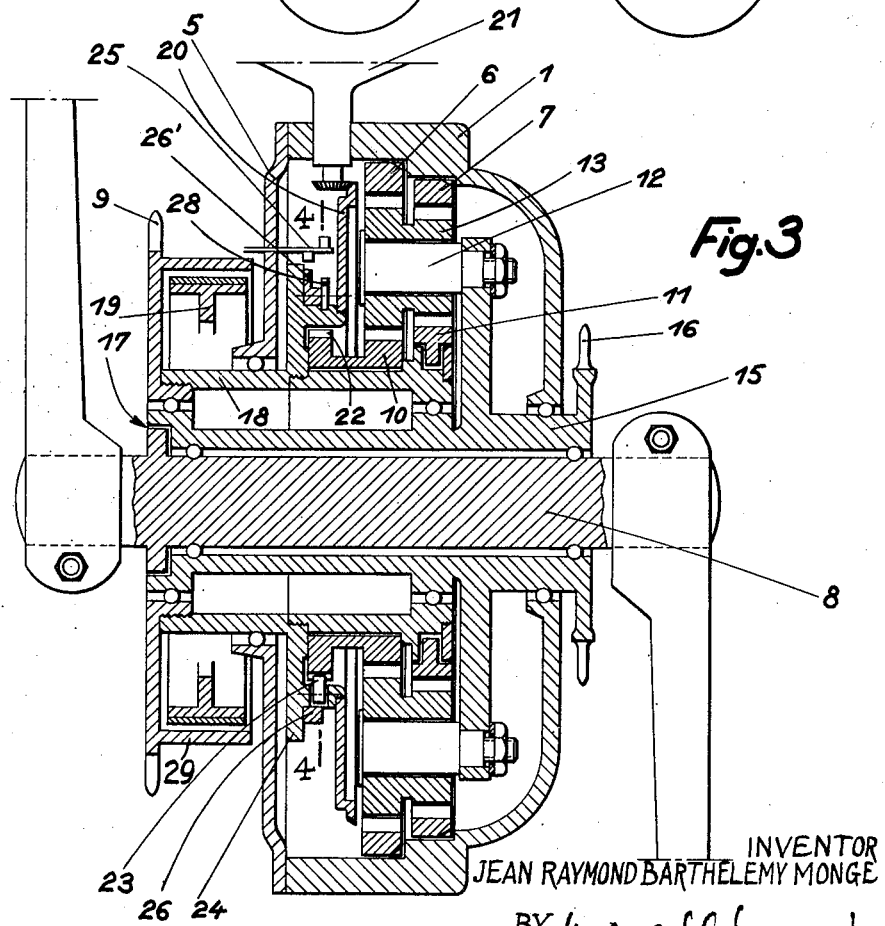
Figure 3 is a diagrammatic vertical section of a four-speed gear box for a bicycle or motorcycle.

Thus in the apparatus appearing in Fig. 3, a group of pinions and gears, to be referred to, are all contained in a carrier formed of two parts, namely a casing 1 and a ring cover 5 of light alloy or any desired metal. Two internal ring or orbit gears 6 and 7 of different diameters, which may or may not be mounted on ball bearings are freely rotatable under certain conditions in the carrier. These ring gears are preferably arranged to be alternately braked at will in such fashion as to be incapable of further rotation in the carrier 1. Within the latter, the internal teeth of gears 6 and 7 mesh with a plurality of planetary gears 13, each of which includes two rows of teeth of different diameters but integral with the gear involved, and each gear being rotatably mounted either directly on a stud shaft 12 or upon ball bearings arranged thereon, if this is preferred.

Stud shafts 12 are all secured in substantially mutual parallelism on an intermediate member 15 which extends entirely through the equipment box, and upon one end is provided with a chain sprocket 16 rigid or integral therewith and driven by a motor. Through the intermediate member 15, in turn extends a pedal axle 8 which is rotatable therein and capable of clutching or engaging with member 15 by means of a clutch merely indicated at 17, and not actually shown for the sake of clarity and simplicity in the drawings, but yet of such free wheeling character that the axle cannot be clutched or engaged by member 15. Upon the latter member is mounted a sleeve 18 running on ball bearings or ordinary bearings, and thus freely rotatable on this member 15. The sleeve is provided at one end with a chain sprocket 9 and on the other end and within the latter are mounted a pair of separate pinions 10 and 11, respectively meshing with the greater and smaller rows of teeth on the planetary gears 13. The sprocket 9 is preferably connected by a chain to a corresponding sprocket secured to the rear wheel of the motorcycle for driving said wheel.

Figure 4:
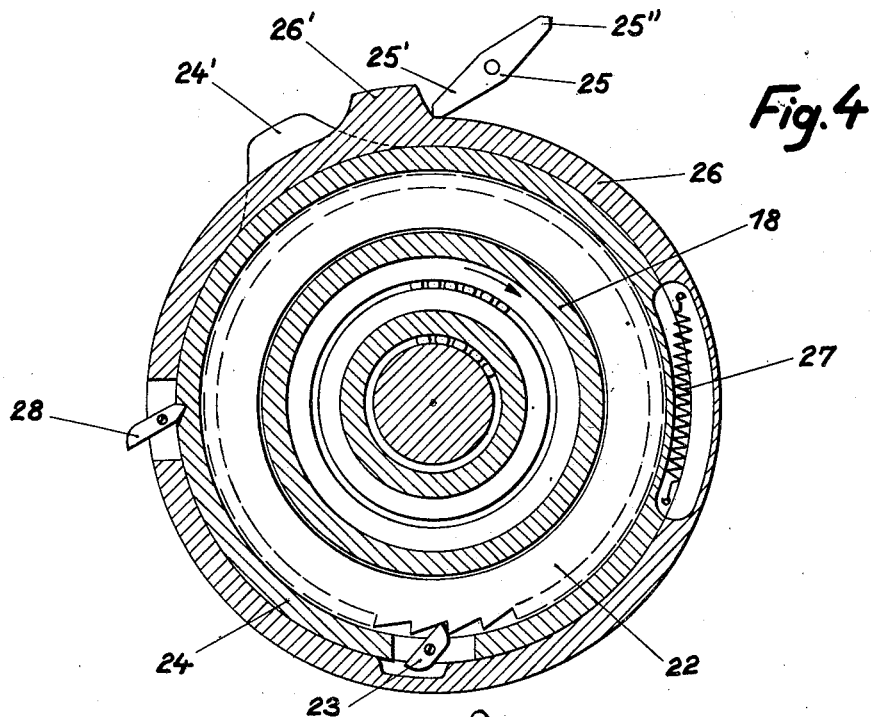
Figure 4 is a diagrammatic section on an enlarged scale of the clutch of Figure 3 (clutched position) as taken on line 4—4.
Figure 5:
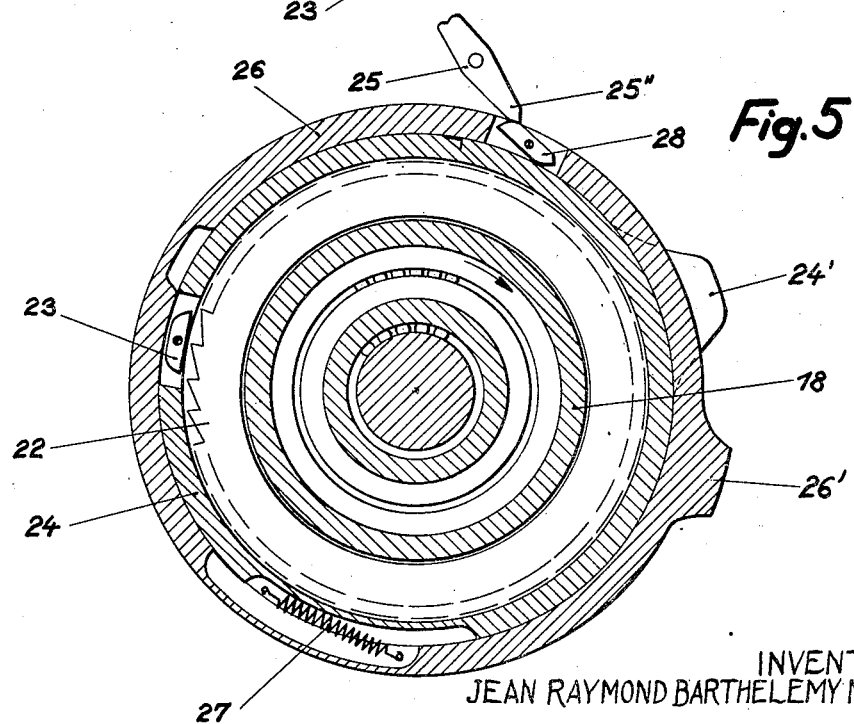
Figure 5 is a similar view showing the parts in declutched position.

A brake drum 29 is rigid with sprocket 9 and cooperates with a brake shoe 19 within it supported by pins or studs (not shown) mounted on carrier cover 5. Pinion 11 is mounted in free wheeling fashion on sleeve 18 so as to be capable of clutching or engaging with this sleeve in one direction without being engaged by the sleeve, while pinion 10 is freely rotatable on the same sleeve but may be independably locked thereon by clutch means shown in Figs. 4 and 5 presently to be described. The clutch means referred to is rigid with a large bevel gear 20 meshing with a bevel pinion rotatably mounted on a lighting generator 21 and extending into casing 1.

Upon considering the operation of the apparatus, it is to be assumed that the motorcycle involved is at least temporarily at rest, with sprocket 9 connected by a chain to the corresponding sprocket (not shown) on the rear wheel of the motorcycle; that the motor itself is stationary and connected by a chain to sprocket 16 of intermediate member 15 extending through casing 1; and that the clutch device is disengaged as indicated in Fig. 5. In the position illustrated in this figure, pinion 10 is not rigid with sleeve 18, but is at this time entirely idle. It is also assumed that internal orbit gear 7 is locked in casing 1 by a locking means (not shown). Under these conditions internal gear 6 is free and the apparatus operates as though this gear did not exist.

With all of these assumed conditions prevailing, if the operator starts pedaling, axle 8 clutches or engages with intermediate member 15 by means of clutch 17, which results immediately upon starting the motor connected to sprocket 16. In addition, during operation, shaft 12 of planetary gears 13 describe a circle. The internal gear 7 being locked, the planetary gears are caused to rotate through an epicycloidal path and rotate pinion 11. The latter pinion clutches or engages with sleeve 18, rigid with sprocket 9, and the motorcycle starts off.

If the operator ceases to pedal, the motor continues to keep the wheel clutched by means of sprocket 16 forming part of intermediate member 15 and of the mechanism as a whole. If instead of braking internal gear 7, internal gear 6 is braked, a second speed of operation will be obtained. Substantially the same reasoning will demonstrate that following the position of the clutch means of Figs. 4 and 5 it is possible to select operation at will by using pinion 10 or pinion 11, which will of course provide two speeds in addition to those produced by braking either one of ring gears 6 or 7. The assemblage thus far described is obviously a universal equipment box providing four speeds.

The internal gears 6 and 7, as well as pinion 11 and the clutch means of Figs. 4 and 5 are preferably mounted upon catches with the result that the box or casing is free wheeling at all speeds. Sprocket 9 being connected by a chain to the rear wheel and the latter being provided with a fixed pinion, the brake shoe 19 normally acts like a free wheel during operation. Thus the gear 20 is rigid with sprocket 9 at any speed of the apparatus. In addition the lighting dynamo 21 driven by the gear 20 likewise functions as a free wheel.

Referring now more specifically to Figs. 4 and 5, the clutch means may be described as follows:

Pinion 10 is provided with a rigid ratchet 22 co-operating with a pawl 23 pivotally mounted on a disc 24 forming a flange on sleeve 18 and which furthermore forms the support for gear 20.

A special rocking device 25, virtually forming an oscillating double pawl controlled by a "Bowden" member is pivotally mounted on casing cover 5. One of the fingers 25' of this double pawl is rocked during rotation and catches ring 26, provided for this purpose with an abutment 26' so as to clamp it for a brief instant, thereby forcing the same to be disposed angularly upon the pawl carrying disc 24 while the latter continues to rotate. This movement tenses a return spring 27 which tends constantly to urge disc 24 and ring 26 back to their respective initial positions. A cam 24' rigid with disc 24 raises the pawl finger 25' and limits the relative displacement of ring 26 with respect to disc 24. At the end of the movement, a limiting pawl 28 pivotally mounted on ring 26 is turned to engage disc 24 and prevents return to initial starting position.

In other words a swingable finger 25' depressed by passage of ring 26 during rotation serves to tense return spring 27, and also frees a pawl 23 to operate and engage with the teeth of ratchet 22 when it is raised, which results in altering the speed of operation of the apparatus as a whole from one speed to another. This engagement of pawl 23 from the position of Fig. 4 to that of Fig. 5 will occur by a reverse operation through action of spring 27.

The seesawing action of the oscillating finger 25'' during passage of pawl 28, releases it and ring 26 returned by its spring 27 resumes its starting position while forcing pawl 23 to disengage ratchet 22 and effects disengagement of pinion 10.

Whatever the arrangement adopted, it is essential that the running can be ensured at will:
  Either by only the pedals (stopped engine);
  Either by only the engine (stopped pedals);
  Either simultaneously by the engine and the pedals, the speeds being always utilizable, even in the case with only the engine running.

Furthermore, it would be possible to put the engine in running by pedalling. The following modification permits arriving at these conditions.

It simply consists of assembling the pedals directly on the axle 52 independently of the planet carrier. The planet carrier can be driven either by the pedals, through the medium of a pawl placed in 53 and of the freewheel type, either directly or by the engine, through the medium of the pinion 54.

There is reason to note the different devices described having a step-up gear effect, permits the use of a small chain pinion on the box and a big pinion on the rear wheel.

There results a very important diminution of the strain undergone by the chain and a greater efficacy of the brake.

Having thus described my invention I claim:

1. In a four speed universal transmission box for bicycles and motorcycles having pedals and comprising a casing for containing a gearing assemblage; the combination of a cover for closing the casing; a pedal axle extending rotatably through the casing and the cover; a first annular member concentrically mounted on the pedal axle; means for rigidly connecting said pedal axle with the annular member in one direction of rotation; means for connecting said annular member with a prime mover; a pair of opposite radial arms rigidly fixed on said annular member; a pair of shafts individually secured upon the radial arms; a pair of planetary gears rotatably mounted on the shafts; a pair of internal orbit or ring gears concentric with said pedal axle and meshing by their internal teeth with the planetary gears; means for alternatively and selectively immobilizing one or the other of said internal orbit gears with respect to said casing; a second annular member rotatably mounted on the first annular member; a first pinion rotatably mounted on the second annular member and meshing with said planetary gears; means for rigidly connecting the first pinion with said second annular member in one direction of rotation; a second pinion rotatably mounted on said second annular member; means for rigidly connecting the second pinion with said second annular member in one direction of rotation; a gear rigid with said second annular member adapted to drive a lighting generator; means for connecting said second annular member to a sprocket associated with the rear wheel of a motorcycle; and means for braking said pedal axle at will.

2. In a four speed universal transmission box for bicycles and motorcycles having pedals and comprising a casing for containing a gearing assemblage, the combination of a cover for closing the casing; a pedal axle extending rotatably through the casing and the cover; a first annular member concentrically mounted on the pedal axle; clutch means permanently effective to lock relative rotation of said annular member with respect to said pedal axle in one direction of rotation; a gear fixed on one extremity of said annular member externally of said casing for receiving the drive of a prime mover; two radial arms fixed on said annular member; a pair of shafts fixed on the outer ends of the arms in substantial parallelism to said pedal axle; a pair of planetary gears rotatably mounted on said shafts and each having two rows of gear teeth of different diameters; a plurality of rotatable internal orbit or ring gears meshing with the rows of gear teeth on said planetary gears; pawls mounted in effective positions for separately immobilizing said internal orbit gears with respect to said casing; a second annular member idly mounted on the first annular member; a first rotatable pinion meshing with the lesser rows of gear teeth on said planetary gears; clutch means permanently effective to lock relative rotation of the first pinion with respect to said second annular member in one direction of rotation; a second rotatable pinion meshing with the larger rows of gear teeth on said planetary gears and mounted idly on said second annular member; means for locking said second pinion with said second annular member in one direction of rotation; a gear rigid with said second annular member for driving a lighting generator; a chain sprocket rigid with said second annular member externally of said casing for driving a corresponding sprocket associated with a wheel on the bicycle or motorcycle involved; a brake drum rigid with said chain sprocket; and brake shoe means cooperating with said brake drum for braking said pedal axle at will.

3. In a four speed universal transmission box for bicycles and motorcycles having pedals and comprising a casing for containing a gearing assemblage, the combination of a cover for closing the casing; a pedal axle extending rotatably through the casing and the cover; a first annular member concentrically mounted on the pedal axle; clutch means permanently effective to lock relative rotation of said annular member with respect to said pedal axle in one direction of rotation; a gear fixed on one extremity of said annular member externally of said casing for receiving the drive of a prime mover; two radial arms fixed on said annular member; a pair of shafts fixed on the outer ends of the arms in substantial parallelism to said pedal axle; a pair of planetary gears rotatably mounted on said shafts and each having two rows of gear teeth of different diameters; a plurality of rotatable internal orbit or ring gears meshing with the rows of gear teeth on said planetary gears; pawls mounted in effective positions for separately immobilizing said internal orbit gears with respect to said casing; a second annular member idly mounted on the first annular member; a first rotatable pinion meshing with the lesser rows of gear teeth on said planetary gears; clutch means permanently effective to lock relative rotation of the first pinion with respect to said second annular member in one direction of rotation; a second rotatable pinion meshing with the larger rows of gear teeth on said planetary gears and mounted idly on said second annular member; a disc rigid with said second pinion; a ratchet rigid and concentric with said disc and second pinion; a releasable pawl pivotally mounted on the disc; a ring member concentric with the pedal axle for actuating the pawl; an abutment upon the periphery of the ring member; a manually operable double pawl pivoted at an intermediate portion thereof on the cover of said casing; a stop rigid with said ring member, the second annular member having a recess in which the first mentioned pawl is adapted to engage; a cam fixed on said mentioned ring member effective to raise said double pawl and cause the same to engage said second annular member; a return spring interconnecting said ring member and said annular member and biasing both members toward initial starting positions; a gear rigid with said second annular member for driving a lighting generator; a chain sprocket fixed on one end of said second annular member externally of said casing; a brake drum rigid with said chain sprocket; and brake shoe means movable within said brake drum in order to cooperate with the latter and brake said pedal axle at will.

JEAN RAYMOND BARTHÉLÉMY MONGE.

REFERENCES CITED

The following references are of record in the file of this patent:

UNITED STATES PATENTS

| Number | Name | Date |
| --- | --- | --- |
| 1,909,099 | Gessner | May 16, 1933 |
| 2,001,036 | Prince | May 14, 1935 |
| 2,095,207 | Watter | Oct. 5, 1937 |

FOREIGN PATENTS

| Number | Country | Date |
| --- | --- | --- |
| 324,344 | France | Mar. 28, 1903 |
| 510,500 | Great Britain | Aug. 2, 1939 |